United States Patent [19]

Takanashi et al.

[11] Patent Number: 4,857,995
[45] Date of Patent: Aug. 15, 1989

[54] COLOR IMAGING APPARATUS INCLUDING CONTROL SYSTEM FOR STABILIZING PHASE AND FREQUENCY OF A VIDEO SIGNAL CARRIER FREQUENCY

[75] Inventors: Itsuo Takanashi, Kamakura; Shintaro Nakagaki, Fujisawa; Hiroshi Ichimura; Ichiro Negishi, both of Tokyo; Masaru Osada, Yokosuka, all of Japan

[73] Assignee: Victor Company of Japan, Ltd., Japan

[21] Appl. No.: 108,988

[22] Filed: Oct. 14, 1987

Related U.S. Application Data

[63] Continuation-in-part of Ser. No. 790,455, Oct. 23, 1985, Pat. No. 4,736,243.

[30] Foreign Application Priority Data

Oct. 15, 1986 [JP] Japan .............................. 61-157873[U]
Oct. 15, 1986 [JP] Japan .............................. 61-157874[U]
Oct. 15, 1986 [JP] Japan .............................. 61-157875[U]

[51] Int. Cl.$^4$ ........................ H04N 9/083; H04N 9/07
[52] U.S. Cl. ........................................ 358/47; 358/44
[58] Field of Search ................ 358/41, 43, 44, 45, 358/46, 47

[56] References Cited

U.S. PATENT DOCUMENTS

| | | | |
|---|---|---|---|
| 3,755,620 | 8/1973 | McMann ............................. | 358/45 |
| 3,939,486 | 2/1976 | Tomii .................................. | 358/46 |
| 4,041,528 | 8/1977 | Miyoshi et al. ..................... | 358/47 |
| 4,163,250 | 7/1979 | Tomii et al. ....................... | 358/45 |
| 4,185,296 | 1/1980 | Nishikawa et al. ................. | 358/45 |
| 4,305,022 | 12/1981 | Mitamura et al. ................. | 358/67 |
| 4,620,221 | 10/1986 | Takanashi et al. ................. | 358/47 |
| 4,691,227 | 9/1987 | Takanashi et al. ................. | 358/47 |
| 4,736,242 | 4/1988 | Takanashi et al. ................. | 358/44 |
| 4,736,243 | 4/1988 | Takanashi et al. ................. | 358/47 |

FOREIGN PATENT DOCUMENTS 53-34854 9/1978 Japan .
57-201395 12/1982 Japan ............................... 358/43

Primary Examiner—James J. Groody
Assistant Examiner—Randall S. Svihla
Attorney, Agent, or Firm—Lowe, Price, Leblanc, Becker & Shur

[57] ABSTRACT

A color filter has a plurality of succesively arranged recurrent groups of different color stripes. An image pickup tube has a photoelectrical conversion target exposed to light passing through the color filter and an index signal generation pattern. The image pickup tube outputs a signal containing a color signal component determined by a carrier which is modulated with the individual color stripes of each recurrent group of the color filter. The output signal from the image pickup tube also contains an index signal component which depends on the index pattern. A first memory holds at least part of the index signal component. The index signal component held by the memory is periodically updated. A second memory holds a portion of the output signal from the image pickup tube which was obtained under conditions where a predetermined color light illuminates the photoelectrical conversion target via the color filter. A reference signal is generated in accordance with the index signal component read from the first memory and with the signal portion read from the second memory. A color signal is detected from the output signal of the image pickup tube by use of the reference signal.

6 Claims, 5 Drawing Sheets

COLOR IMAGING APPARATUS INCLUDING CONTROL SYSTEM FOR STABILIZING PHASE AND FREQUENCY OF A VIDEO SIGNAL CARRIER FREQUENCY

CROSS-REFERENCES TO RELATED APPLICATIONS

This is a continuation-in-part of application Ser. No. 790,455, filed Oct. 23, 1985 now U.S. Pat. No. 4,736,243.

BACKGROUND OF THE INVENTION

This invention generally relates to a color imaging apparatus, and specifically relates to a color imaging apparatus including an image pickup tube and a striped color filter disposed in a light path to a photoelectrical conversion target of the image pickup tube to produce a luminance signal and color component signals in accordance with an industry standard television system.

Some color imaging apparatus include an image pickup tube and a striped color filter disposed in a light path to a photoelectrical conversion target of the image pickup tube. A line-by-line rectangular raster scan allows the image pickup tube to generate a color-multiplexed video signal from which given color signals are derived. For example, U.S. Pat. No. 4,620,221 discloses such a color imaging apparatus. Characteristics of the color-multiplexed signal outputted by the image pickup tube generally depend on electron beam scanning conditions which are liable to vary due to various factors. Variations in the characteristics of the color-multiplexed signal sometimes cause inaccuracies in the given color signals. A circuit or device for compensating for such variations in the characteristics of the color-multiplexed signal is generally complicated.

SUMMARY OF THE INVENTION

It is an object of this invention to provide an accurate and simple color imaging apparatus.

A color imaging apparatus of this invention comprises:

(a) a color filter having a plurality of successively arranged recurrent groups of different color stripes;

(b) an index signal generation pattern;

(c) an image pickup tube having a photoelectrical conversion target exposed to light passing through the color filter and the index pattern, the image pickup tube outputting a video signal containing a color signal component, in the form of a carrier having a first carrier frequency and modulated in frequency and phase in accordance with colors of the light, the output signal from the image pickup tube also containing an index signal component which depends on the index pattern;

(d) first holding means for holding a part of the index signal component, which corresponds to at least one horizontal scanning line, and for periodically updating the part of the index signal component held therein in synchronism with a nominal vertical scanning frequency, and for repeatedly reading out therefrom the part of the index signal component at a reading rate synchronous with the nominal horizontal scanning frequency and thereby generating a field signal having a second carrier frequency corresponding to said index signal generation pattern;

(e) first frequency conversion means for converting the first carrier frequency of the color signal component into a third carrier frequency in response to the field signal having the second carrier frequency;

(f) second holding means for holding a portion of a signal outputted from said first frequency conversion means, which portion corresponds to scanning lines included in at least one frame period, which scanning lines are obtained under conditions where the photoelectrical conversion target was exposed via the color filter to light having a color equal to one of the colors of the stripes of the color filter, and for repeatedly reading out the held signal portion therefrom at a reading rate synchronous with the nominal horizontal scanning frequency and the nominal vertical scanning frequency and thereby generating a first frame signal having the third carrier frequency;

(g) second frequency conversion means for converting the third carrier frequency of the first frame signal into a fourth carrier frequency in response to the field signal having the second carrier frequency thereby generating a second frame signal having the fourth carrier frequency;

(h) means for modifying the phase of the carrier of the second frame signal having the fourth carrier frequency to produce reference signals having a predetermined phase difference therebetween; and (i) means for detecting color component signals from the output video signal of the image pickup tube in response to the reference signals.

In another color imaging apparatus of this invention, a color filter has a plurality of successively arranged recurrent groups of different color stripes. An image pickup tube has a photoelectrical conversion target exposed to light passing through the color filter. The image pickup tube outputs a video signal containing a color signal component determined by a carrier which is modulated in phase in accordance with the individual color stripes of each recurrent group of the color filter. A first frequency converter converts the frequency of the output video signal from the image pickup tube in accordance with a first conversion carrier and outputs a first frequency-converted signal. Before normal color image pickup operation, a portion of the first frequency-converted signal is stored in a first memory under conditions where a predetermined color light illuminates the photoelectrical conversion target via the color filter. The stored portion of the first frequency-converted signal corresponds to at least one frame interval of the video signal. A second frequency converter reads the stored signal from the first memory. The second frequency converter converts the frequency of the read signal in accordance with a second conversion carrier and outputs a second frequency-converted signal. A reference signal is generated in accordance with the second frequency-converted signal. A color signal is detected from the output signal of the image pickup tube in accordance with the reference signal. An index signal generation pattern disposed in a light path to the photoelectrical conversion target serves to generate an index signal in the output signal from the image pickup tube. The index signal occurs for at least one horizontal scanning interval. A second memory holds the index signal during one vertical scanning interval of the video signal. The index signal in the second memory is updated for each vertical scanning interval. The index signal is read from the second memory for each horizontal scanning interval. The read index signal is supplied to the first and second frequency converters as the first and second conversion carriers.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
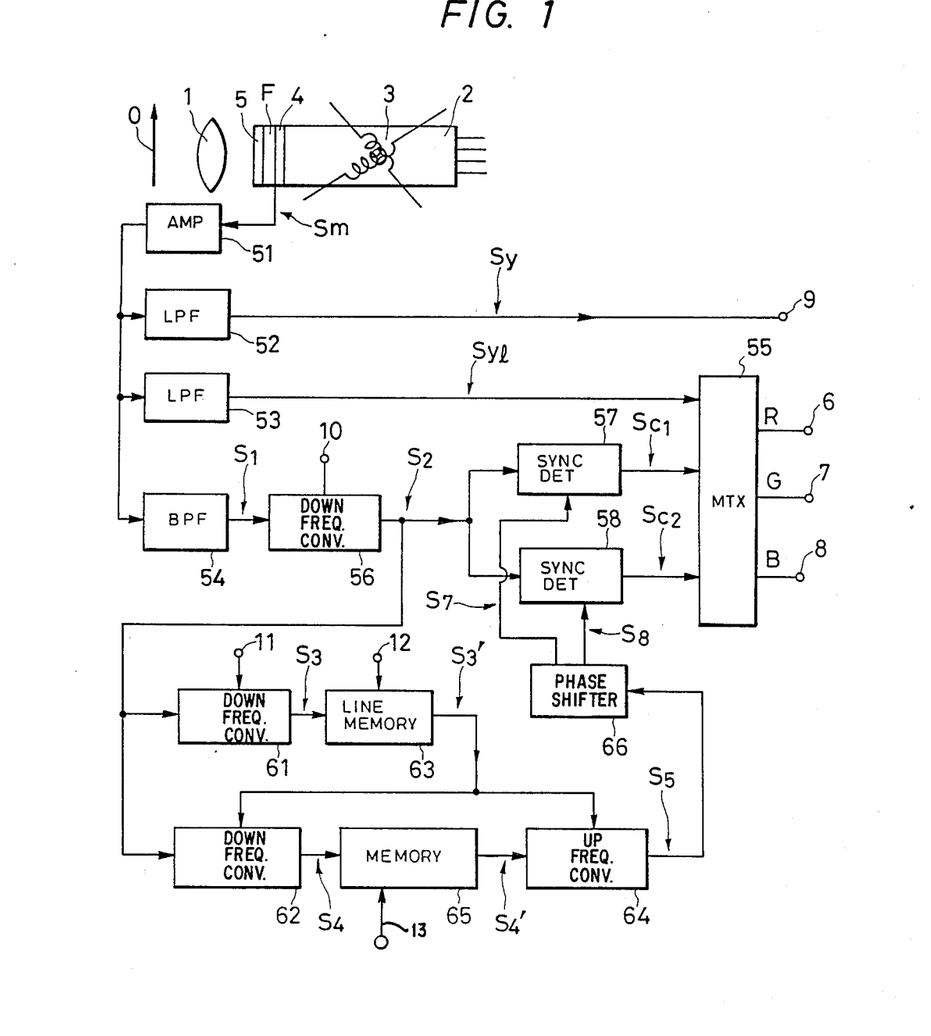
FIG. 1 is a block diagram of a color imaging apparatus according to a first embodiment of this invention.

With reference to FIG. 1, a color imaging apparatus includes a lens 1 and an image pickup tube 2 extending at the rear of the lens 1. The image pickup tube 2 has a pair of vertical and horizontal deflection yokes 3, a photoelectrical conversion target 4, a striped color filter F, and an evacuated envelope including a transparent faceplate 5. The color filter F extends between the photoelectrical conversion target 4 and the faceplate 5. The lens 1 focuses a scene of an object 0 on the photoelectrical conversion target 4 through the color filter F. Line-by-line rectangular raster scan allows the image pickup tube 2 to generate a color-multiplexed video signal Sm in accordance with the scene of the object 0.

Figure 2:
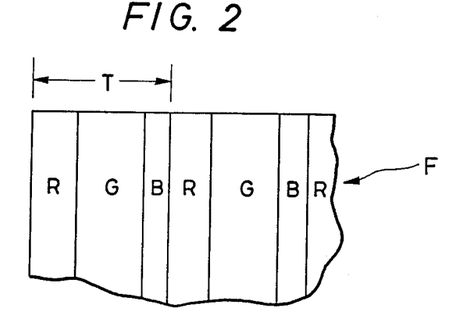
FIG. 2 is a plan view of a portion of the color filter of FIG. 1.
Figure 3:
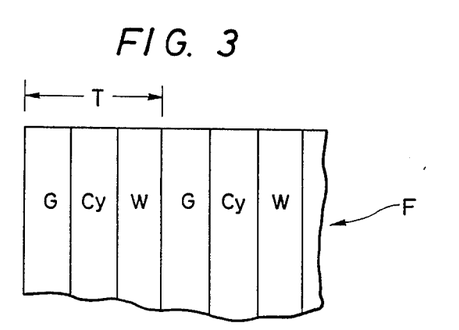
FIG. 3 is a plan view of a portion of a modified color filter.

As shown in FIG. 2, the color filter F includes successively arranged recurrent groups of vertical stripes of red (R), green (G), and blue (B). As shown in FIG. 3, the color filter F may include successively arranged recurrent groups of vertical green (G) stripes, cyan (Cy) stripes, and transparent (W) stripes. It should be noted that the color filter F may also include successively arranged recurrent groups of stripes of different colors designed in other manners. In FIGS. 2 and 3, the character T denotes a period of recurrence of color stripe groups, when the color filter F is scanned by an electron beam of the image pickup tube 2.

The color-multiplexed video signal Sm contains a dc component and color signal components in a form of carrier being modulated in frequency, phase and amplitude caused by passage of the image through the color stripe filter F. The carrier has a frequency fl inversely proportional to the period T of recurrence of color stripe groups in the color filter F. Specifically, the carrier is modulated in frequency and phase corresponding to the individual stripes of each recurrent group of the color filter F and is modulated in amplitude corresponding to the intensity of light passed through the individual stripes.

The color-multiplexed video signal Sm is applied via a preamplifier 51 to low pass filters 52 and 53, and a band pass filter 54. The low pass filter 52 has a preset cut-off frequency and passed a wide-band luminance component Sy of the video signal to an output terminal 9. The low pass filter 53 has a preset cut-off frequency lower than the cut-off frequency of the low pass filter 52 and passes a lower frequency range luminance component Syl of the video signal to a matrix (MTX) circuit 55. The band pass filter 54 passes the color signal components Sl of the video signal to a frequency converter 56. Except for the following, the filter arrangement and its functions and matrixing the filtered signals to produce color component signals are carried out principally along the operation described in the U.S. Pat. No. 4,041,528 issued to the same applicant.

The frequency converter 56 mixes the multiplexed-color signal Sl and a frequency conversion carrier fed via a terminal 10 and the signal Sl is down-converted in frequency into a color multiplexed signal S2 by the frequency conversion carrier fed to terminal 10. This frequency reduction enables later processes of the color-multiplexed signal to be more more easily performed. The frequency of the frequency conversion carrier is preferably generated in connection with the frequency of horizontal sync pulses. The output signal S2 of the frequency converter 56 is applied to synchronous detectors 57 and 58, and to frequency converters 61 and 62.

The frequency converter 61 mixes the signal S2 and a frequency conversion carrier fed via a terminal 11, and the signal S2 is further down-converted in frequency into a signal S3. The output signal S3 of the frequency converter 61 is applied to a 1-line memory 63. The frequency reduction by the frequency converter 61 enables the capacity of the 1-line memory 63 to be smaller. The frequency of the frequency conversion carrier fed to the terminal 11 is preferably generated in connection with the frequency of horizontal sync pulses.

The 1-line memory 63 writes, with a known method, one scanning line out of the scanning lines included within one field of the signal S2. The carrier frequency of the written one scanning line represents scanning characteristics of the electron beam, i.e. the speed and the instantaneous position of the beam with respect to the target 4 and thus with respect to the color filter F placed in front thereof. The written one scanning line is kept for one field period before being updated, namely the update occurs every field period. When read out, the written one scanning line is repeatedly read out from the 1-line memory 63 at a rate equal to a nominal horizontal scanning frequency of a desired industry standard television system in response to a control signal fed to a terminal 12 from a standard signal generator in accordance with the system. The read out operation is therefore carried out on every updated written one scanning line so as to produce a field signal S3′, the resulted signal s3′ maintains the carrier frequency of the one scanning line of the signal S3 picked out of the scanning lines for writing at the writing operation. The signal S3′ is then fed to the frequency converter 62 and to a frequency converter 64. The written one scanning line includes an index signal as follows.

Figure 4:
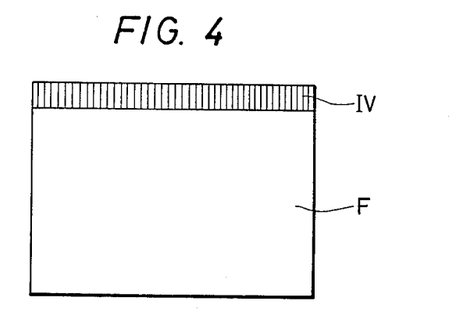
FIG. 4 is a plan view of a portion of the image pickup tube 1.

As shown in FIG. 4, an index signal generation pattern IV may be formed together with the color filter F extending along an upper horizontal edge of the color filter F which is located behind the faceplate 5. During a beginning of each vertical scanning period, the electron beam scanning the top portion of the photoelectrical conversion target 4 corresponding to the index signal generation pattern IV generates an index signal S3i to be stored in the 1-line memory 63. The index signal generation pattern IV is designed so that a given-frequency index signal occurs in the output signal Sm of the image pickup tube 2 when the electron beam scans horizontally at a desired speed across the area corresponding to the pattern IV. As the frequency and phase of the carrier of the color-multiplexed video signal Sm deviate due to a change in the electron beam scanning speed and the starting position of each scan, the frequency and phase of the index signal S3 vary correspondingly. A known arrangement (not shown) allows the index signal generation pattern IV to be continuously and uniformly illuminated with an external bias light.

As described previously, an index signal occurs at a beginning of each vertical scanning period. During each vertical scanning period, the 1-line memory 63 holds the part of the index signal corresponding to one horizontal scanning line. In response to a control signal applied to the 1-line memory 63 via a control terminal 12 required for writing operation of the memory 63, the part of the index signal S3 corresponding to one horizontal scanning line is written in the memory 63. During periods other than the writing mode period, the one scanning line of the index signal S3i is repeatedly read out from the 1-line memory 63 at a rate synchronized with the nominal horizontal scanning frequency and is then applied to the frequency converters 62 and 64. As described before, each time a vertical scanning period starts, the index signal S3 stored in the 1-line memory 63 is updated. In other words, the updated index signal S3i is held at the 1-line memory 63 for each vertical scanning period. The updating of the index signal S3i stored in the 1-line memory 63 at every field period enables the frequency and phase of the output signal S3' from the memory 63 to reflect deviations of the frequency and phase of the carrier of the color-multiplexed video signal Sm occurred in terms of field rate. In other words, the frequency and phase of the output signal S3' from the 1-line memory 63 include speed and positional errors of the electron beam scanning the index pattern, which appear at the field rate.

The 1-line memory 63 preferably includes a combination of an analog-to-digital (A/D) converter, a read/write digital memory, and a digital-to-analog (D/A) converter. The signal S3 outputted from the frequency converter 61 is changed by the A/D converter into a corresponding digital signal, which is written in the digital memory. The digital signal read from the digital memory is changed back to the signal S3' by the D/A converter. The frequency of the control signal applied to the 1-line memory 63 is preferably generated in relation to frequencies of the vertical sync pulses and the horizontal sync pulses.

The frequency converter 62 mixes the output signal S2 of the frequency converter 56 and the signal S3' from the 1-line memory 63 and converts the signal S2 in carrier frequency into a signal S4 in accordance with the signal S3'. The output signal S4 of the frequency converter 62 is applied to a memory 65. The frequency converter 62 performs a carrier frequency reduction of the signal S2, which enables the capacity of the memory 65 to be smaller.

As an initial calibration, a reference color imaging operation is performed before normal color image pickup operation. During the reference color imaging operation, the color imaging apparatus is directed to take a scene having substantially a uniform brightness and a color equal to one of the stripe colors of the color filter F, in this regard, a typical method is placing a color filter of the selected one of the stripe colors in the lens system and directing the color imaging apparatus toward a plain white board. The memory 65 is controlled to write a part of the signal S4 corresponding to at least one frame period. After the initial calibration is completed and during the normal color image pickup operation, the written part of the signal S4 is no longer updated before the next calibration, but is repeatedly read out at a rate synchronized with both the nominal horizontal and vertical scanning frequencies of the desired industry standard television system to produce a signal S4' in response to a control signal fed to a terminal 13 from a standard signal generator in accordance with the industry standard television system. The resulted signal S4' maintains the carrier frequency of the signal S4 observable within each scanning line. The signal S4' read out from the memory 65 is in turn applied to the frequency converter 64.

The memory 65 preferably includes a combination of an analog-to-digital (A/D) converter, a read/write digital memory, and a digital-to-analog (D/A) converter. The signal S4 outputted from the frequency converter 62 is changed by the A/D converter into a corresponding digital signal, which is written in the digital memory. The digital signal read out from the digital memory is changed back to the signal S4' by the D/A converter. The digital memory is controlled by signals, frequencies of which are prefered to be in relation to the frequencies of vertical sync pulses and horizontal sync pulses.

The frequency converter 64 mixes the output signal S4' of the memory. 65 and the output signal S3' of the 1-line memory 63 and converts the signal S4' in carrier frequency into a S5 in accordance with the signal S3'. The frequency converter 64 increases the carrier frequency of the signal S4'. The combination of the frequency converters 62 and 64 are designed so that the carrier frequency of the output signal S5 from the frequency converter 64 is substantially or approximately equal to the carrier frequency of the input signal S2 to the frequency converter 62. Since the carrier frequency and phase of the index signal S3' outputted from the 1-line memory 63 depend on the frequency and phase of the carrier of the color-multiplexed video signal Sm as described previously, the carrier frequency and phase of the output signal S5 from the frequency converter 64 also varies in accordance with the frequency and phase of the carrier of the color-multiplexed video signal Sm. In addition, the output signal S5 of the frequency converter 64 depends on the signal S4' read from the memory 65 and obtained during the reference color imaging operation. The output signal S5 of the frequency converter 64 is applied to a phase shifter 66.

In case of the high-definition television system utilizing more than 1,000 scanning lines for one frame and being proposed to the industry, the frequency of the signal Sl is for example 36 MHz; S2 and S5, 16 MHz; S3 and S3', 3 MHz; S4, S4' and the signal supplied to the terminal 11, 13 MHz.

The signal S5 is subject to a phase shift at the phase shifter 66 to produce reference signals S7 and S8 which are supplied to the synchronous detectors 57 and 58 respectively. The reference signals S7 and S8 have a common frequency, but phases thereof are modified by the phase shifter 66 to have predetermined values with respect to the phase of the carrier of the color-multiplexed video signal S2. The predetermined values are dependent upon the type of color filter F used such as shown in FIG. 2 or 3 and desired types of output color component signals. In this regard, the phase arrangement is made in accordance with known principles, one of which will be found in the parent application Ser. No. 790,455.

As a result of the calibration and the heterodyne processes by the two frequency converters 62 and 64, the resultant signal S5 now contains:

1) scanning lines the starting positions of which are aligned as they are read out from the memory 65 at the nominal horizontal frequency 2) a carrier, the frequency of which consists of the carrier frequency when generated at the calibration, and an error component which is a difference between the index signal S3$i$ when calibrated and the index signal S3$i$ of an up to date field supplied to the 1-line memory 63.

Accordingly, when the synchronous detections are carried out at the synchronous detectors 57 and 58, the phase error if included in the signal S2 is compensated by the error component contained in the signal S5 from which the signals S7 and S8 are produced.

As described previously, before the normal color image pickup operation, the reference color imaging operation is performed and the signal S4 outputted by the frequency converter 62 is written in the memory 65. The part of the signal S4 corresponding to at least one frame period is stored in the memory 65. Specifically, when control buttons or switches (not shown) in a control section of the color imaging apparatus are manipulated, a filter of a preselected color is automatically placed in the lens system so that light of the preselected color is applied to the image pickup tube 2 through the color filter F and the part of the signal S4 corresponding to at least one frame interval is accordingly written in the memory 65. For example, when a switch (not shown) interposed between the frequency converters 56 and 62 is closed, the memory 65 is allowed to write and store the part of the signal S4. During the normal color image pickup operation, this switch remains open.

During writing mode operation, that is, during the reference color imaging operation, the memory 65 writes and stores the part of the signal S4 corresponding to at least one frame period. When writing of the signal S4 in the memory 65 is completed, operation of the memory 65 is changed to a reading mode. During reading mode operation, that is, during the normal color image pickup operation, the part of the signal S4 corresponding to at least one frame interval is repeatedly read from the memory 65 to form a signal S4' which is fed to the frequency converter 64. The device 64 converts the signal S4' into the signal S5 by the signal S3' outputted from the 1-line memory 63. The output signal S5 of the frequency converter 64 is applied to the phase shifter 66. The device 66 derives the reference signals S7 and S8 from the signal S5 by phase shifting. In case the color filter F is a type having R-G-B stripes as shown in FIG. 2, the phase of the signal S7 is 0 degree with respect to red component of the signal S2, and the phase of signal S8 is +90 degrees with respect to the same. The reference signals S7 and S8 are applied to the synchronous detectors 57 and 58 respectively. The synchronous detectors 57 and 58 use the respective reference signals S7 and S8 for demodulating the color-multiplexed video signal S2 and deriving color difference signals Sc1 and Sc2 from the signal S2.

In cases where the color imaging apparatus operates in the normal color image pickup mode and the signal S4' is repeatedly produced from the memory 65, the synchronous detectors 57 and 58 receive the color-multiplexed video signal S2 from the frequency converter 56 and processes the signal S2 through the synchronous detections with the reference signals S7 and S8 supplied from the phase shifter 66. The synchronous detections derive the color difference signals Sc1 and Sc2 from the color-multiplexed video signal S2. These color difference signals Sc1 and Sc2, and the narrow-band luminance signal Syl are applied to the matrix circuit 55. The matrix circuit 55 derives primary color signals R, G, and B from the inputted signals Sc1, Sc2, and Syl and outputs the primary color signals R, G, and B to respective terminals 6, 7, and 8. As described previously, the low pass filter 52 outputs the wide-band luminance signal Sy to the terminal 9.

From the R, G, B components outputted from the matrix circuit 55 and the wide-band luminance component Sy, a composite television signal of the desired system may be composed by addition horizontal, vertical and blanking signals.

During the normal image pickup operation, the frequency and phase of the carrier of the color-multiplexed video signal Sm may deviate due to various factors as explained previously. Deviations in the frequency and phase of the carrier of the color-multiplexed video signal Sm cause corresponding variations in the frequency and phase of the carrier of the frequency-lowered color-multiplexed video signal S2. Since the carrier frequency of the reference signals S7 and S8 is held exactly or essentially equal to the frequency of the carrier of the color-multiplexed video signal S2 as described previously, the variations in the frequency of the carrier of the signal S2 are compensated in the synchronous detections performed in the devices 57 and 58 by use of the reference signals S7 and S8. In addition, the phases of the reference signals S7 and S8 is held exactly or essentially in the fixed relationships with the phase of the carrier of the color-multiplexed video signal S2 as described previously, and variations in the phase of the carrier of the signal S2 are compensated in the synchronous detections of the devices 57 and 58 by use of the reference signals S7 and S8. Accordingly, the variations in the frequency and phase of the carrier of the color-multiplexed video signal S2 are prevented from adversely affecting the available color difference signals Sc1 and Sc2 outputted by the synchronous detectors 57 and 58. Thus, formation of the color difference signals Sc1 and Sc2 can be accurate. Furthermore, as the carrier frequency and phase of the reference signals S7 and S8 are determined in accordance with the signal S4' outputted from the memory 65 which is obtained during the reference color imaging operation, accurate formations of the color difference signals SC1 and Sc2 are ensured.

It should be noted that the frequency converter 56 may be omitted so that the signal S1 is directly fed to the devices 57, 58, 61, and 62. Also the frequency converter 61 may be omitted so that signal S2 is directly fed to the 1-line memory 63.

DESCRIPTION OF THE SECOND PREFERRED EMBODIMENT

Figure 5:
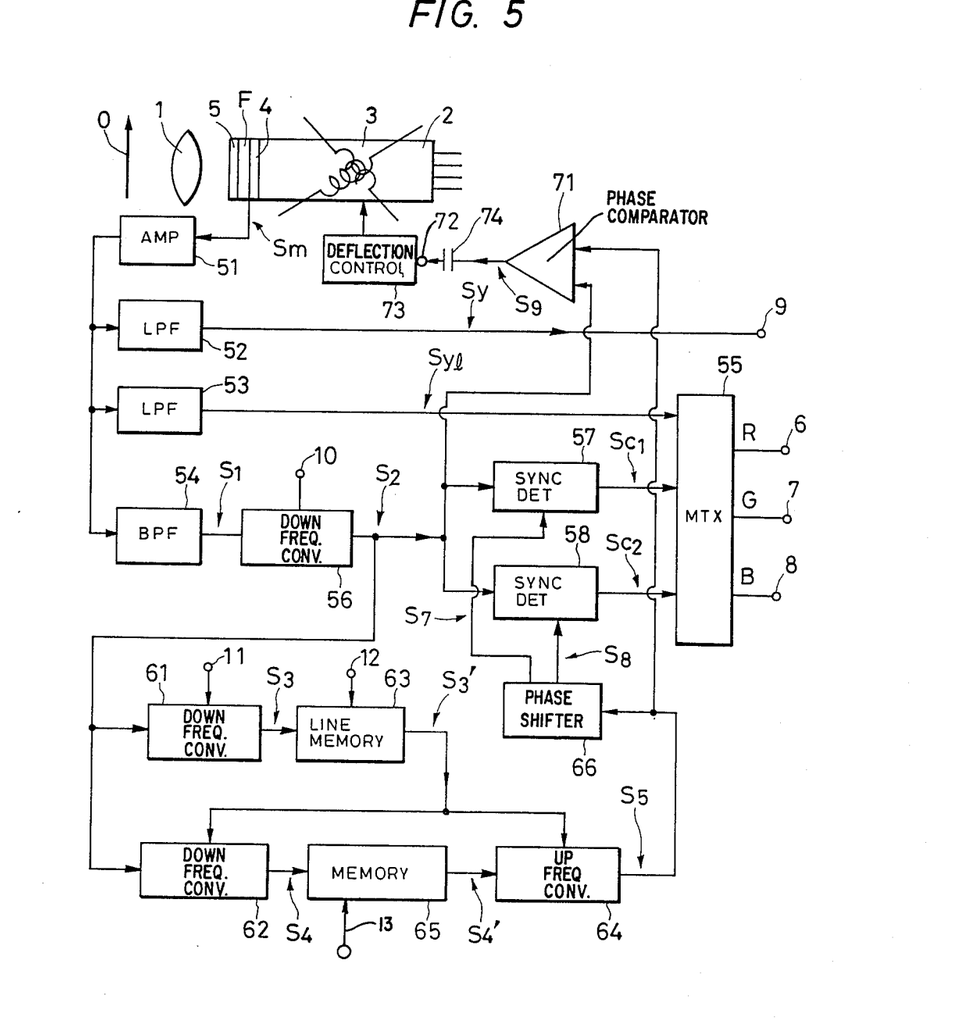
FIG. 5 is a block diagram of a color imaging apparatus according to a second embodiment of this invention.

FIG. 5 shows a second embodiment of this invention which is similar to the embodiment of FIGS. 1–4 except for additional designs described hereinafter.

The embodiment of FIG. 5 includes a phase comparator 71 having first and second input terminals subjected to the signals S2 and S5 outputted by the frequency converters 56 and 64 respectively. The phase comparator 71 generates a signal S9 representing the difference in phase between the carriers of signals S2 and S5. Low frequency drift components of the phase difference signal S9 are applied to an input terminal 72 of a deflection control circuit 73 via a capacitor 74 of extremely large capacity so that the capacitor 74 blocks only a pure DC component of the signal S9 but passes the low frequency drift components thereof.

Figure 6:
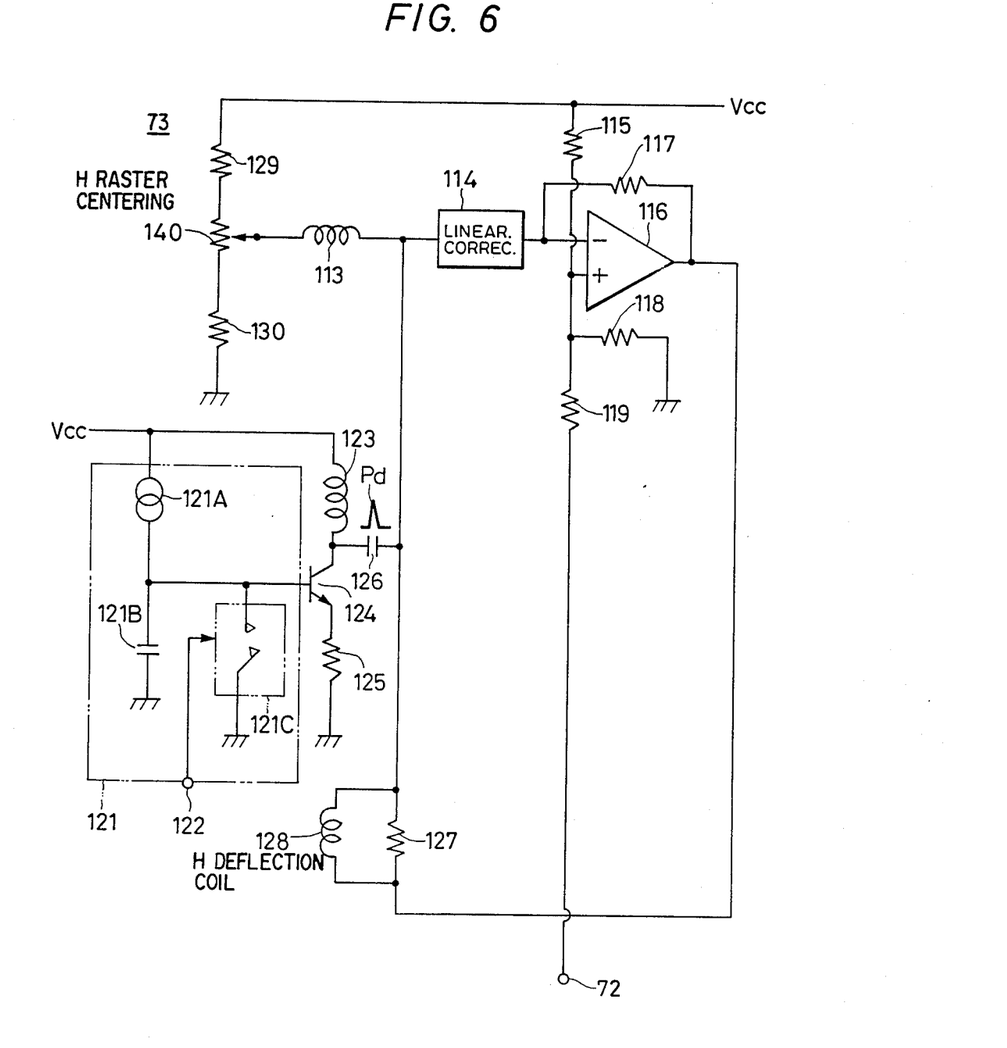
FIG. 6 is a diagram of the deflection control circuit of FIG. 5.

As shown in FIG. 6, the deflection control circuit 73 includes a triangular-wave generation circuit 121 having a constant current supply circuit 121A, a capacitor 121B, and a switching circuit 121C. The capacitor 121B is charged by a constant dc current fed from the constant current supply circuit 121A. When the switching circuit 121C is closed, the capacitor 121B is discharged. The switching circuit 121C is closed and opened in accordance with pulses applied through a terminal 122 and having a period corresponding to the horizontal scanning period. A triangular wave having a horizontal scanning period is induced across the capacitor 121B.

The triangular wave is applied to a base of a transistor 124. A collector of the transistor 124 is connected via an inductor 123 to a positive terminal of a constant voltage source Vcc. A negative terminal of the constant voltage source is grounded. An emitter of the transistor 124 is grounded via a resistor 125. The collector of the transistor 124 is connected via a capacitor 126 to a junction between a resistor 127 and an input terminal of a known linearity correction circuit 114. Deflection pulses Pd produced at the collector of the transistor 124 by differentiating the triangular wave are applied to the linearity correction circuit 114 and the resistor 127.

A series combination of fixed resistors 129 and 130, and a variable resistor 140 connected across the constant voltage source Vcc generates a direct current which is supplied via an inductor 113 to the junction between the resistor 127 and the input terminal of the linearity correction circuit 114. The direct current is adjusted in accordance with the variable resistor 140. The direct current is used in raster centering adjustment.

A horizontal deflection coil 128 of the horizontal deflection yoke 3 (see FIG. 5) is connected across the resistor 127. The horizontal deflection coil 128 is supplied with a current equal to a superposition of the centering adjustment direct current and a horizontal deflection current described hereinafter.

A non-inverting input terminal of an operational amplifier 116 is connected to the positive terminal of the constant voltage source Vcc via a resistor 115 and is grounded via a resistor 118. The non-inverting input terminal of the operational amplifier 116 is also connected to the terminal 72 via a resistor 119 so that the non-inverting input terminal of the operational amplifier 116 receives the ac components of the phase difference signal S9 (see FIG. 5). The combination of the resistors 115 and 118 applies a bias potential to the non-inverting input terminal of the operational amplifier 116. An inverting input terminal of the operational amplifier 116 is connected to an output terminal of the linearity correction circuit 114 so that the inverting input terminal of the operational amplifier 116 receives an output signal of the linearity correction circuit 114. A resistor 117 is connected between the inverting input terminal and an output terminal of the operational amplifier 116. The output terminal of the operational amplifier 116 is connected to the juncture of the horizontal deflection coil 128 and the resistor 127.

The operational amplifier 116 outputs the horizontal deflection current to the horizontal deflection coil 128. The horizontal deflection current depends on the output signal of the linearity correction circuit 114 and on the ac components of the phase difference signal S9 (see FIG. 5). In addition, the amplitude of a dc component of the output signal from the operational amplifier 116 is determined in accordance with the bias potential applied to the non-inverting input terminal of the operational amplifier 116 by the combination of the resistors 115 and 118.

In more detail, the output signal of the operational amplifier 116 has a first component and a second component corresponding to the output signal of the linearity correction circuit 114 and the low frequency drift components of the phase difference signal S9 respectively. The first component of the output signal of the operational amplifier 116 forms a normal deflection current which was subjected to a linearity correction process in the device 114. The second component of the output signal of the operational amplifier 116 forms a centering control signal which depends on and derived from the phase difference between the signals S2 and S5 fed to the phase comparator 71 (see FIG. 5).

Accordingly, the horizontal deflection coil 128 is driven by a current equal to a superposition of the centering adjustment current, the normal deflection current, and the centering control signal. Since the centering control signal depends on the phase difference between the signals S2 and S5' of which the signal S2 contains the up to date starting position of each scanning line and the signal S5 contains the starting position of each scanning line when calibrated the phase difference between the signal S2 and S5 is a horizontal positional error component, so that the raster centering is corrected in accordance with the phase difference between the signals S2 and S5. This correction prevents distortions of a picture or a drift of picture position which would occur and be observable in terms of longer than the field interval resulted from effects such as a variation in a magnetic environment of the color imaging apparatus, or thermal deformation of the constituting components associated to the image pickup tube including the tube itself.

DESCRIPTION OF THE MODIFICATIONS

Figure 7:
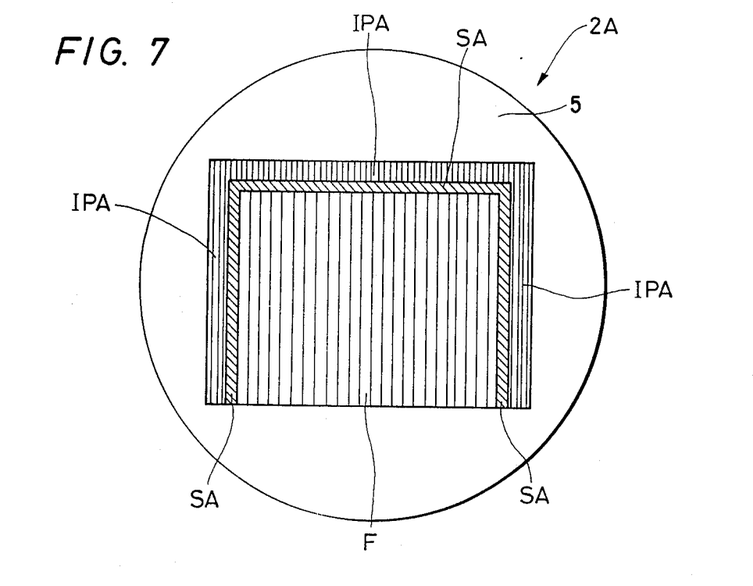
FIG. 7 is a plan view of a faceplate, a color filter, an index signal generation pattern, and an optical shield in a first modified image pickup tube.

FIG. 7 shows a first modified image pickup tube 2A having a faceplate 5 made of a glass plate both of whose surfaces are polished to an optical precision. An index signal generation pattern IPA and a striped color filter F are formed on the rear surface of the faceplate 5 opposing a photoelectrical conversion target. The color filter F has a rectangular outline. The index signal generation pattern IPA is in an inverted U shape. The index signal generation pattern IPA extends outward of the color filter F. Specifically, the index signal generation pattern IPA extends along an upper horizontal edge, as well as along and vertical edges of the color filter F. An optical shield SA formed on the rear surface of the faceplate FP extends between the color filter F and the index signal generation pattern IPA. The optical shield SA has a predetermined width. The optical shield SA is in an inverted U shape corresponding to the shape of the index signal generation pattern IPA. For example, the optical shield SA is made of chromium film formed by vapor deposition. The optical shield SA prevents the index pattern illumination bias light from leaking into the image incident area of the photoelectrical conversion target and also prevents the image light from leaking into the index pattern area of the photoelectrical conversion target. Accordingly, the bias light and the image light are prevented from interfering with each other so that the index signal and the color video signal can be kept accurate.

Figure 8:
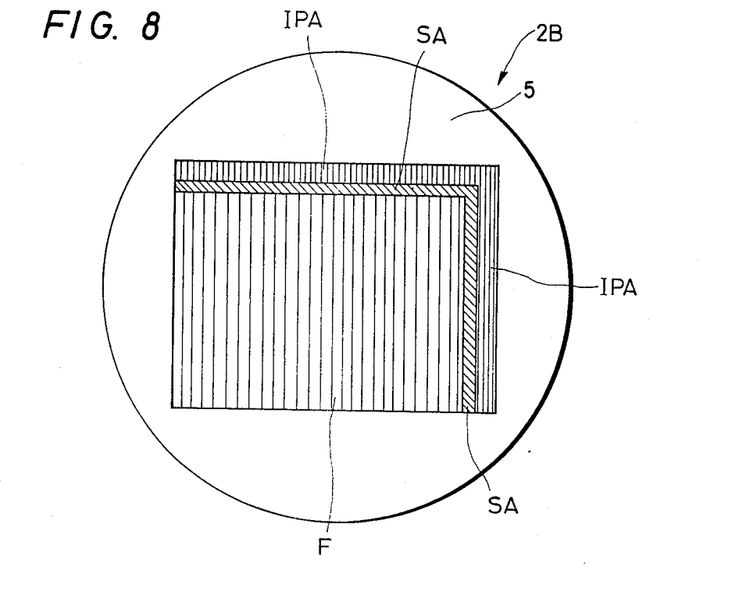
FIG. 8 is a plan view of a faceplate, a color filter, an index signal generation pattern, and an optical shield in a second modified image pickup tube.

FIG. 8 shows a second modified image pickup tube 2A which is similar to the image pickup tube of FIG. 7 except that an index signal generation pattern IPA and an optical shield SA extend along only an upper horizontal edge and a vertical edge of a color filter F.

What is claimed is:

1. A color imaging apparatus comprising:
    (a) a color filter having a plurality of successively arranged recurrent groups of different color stripes;
    (b) an index signal generation pattern;
    (c) an image pickup tube having a photoelectrical conversion target exposed to light passing through the color filter and the index pattern, the image pickup tube outputting a video signal including a plurality of periodic frames each including a plurality of scanning lines, said video signal containing a color signal component in the form of a carrier having a first carrier frequency and being modulated in frequency and phase in accordance with the individual color stripes of each said recurrent group of the color filter, the video signal outputted from the image pickup tube also containing an index signal component which depends on the index pattern;
    (d) first holding means for holding a part of the index signal component, which part corresponds to at least one horizontal scanning line of said video signal, for periodically updating the part of the index signal component held therein in synchronism with a nominal vertical scanning frequency of said video signal, and for repeatedly reading out therefrom the part of the index signal component held therein at a reading rate synchronous with a nominal horizontal scanning frequency of said video signal, thereby generating a field signal having a second carrier frequency corresponding to said index signal generation pattern;
    (e) first frequency conversion means for converting the first carrier frequency of the color signal component into a third carrier frequency in response to the field signal having the second carrier frequency;
    (f) second holding means for holding a portion of a signal outputted from said first frequency conversion means, which portion corresponds to scanning lines included in at least one frame period of the video signal, which scanning lines are obtained under conditions where the photoelectrical conversion target is exposed via the color filter to light having a color equal to the color of one of the color stripes, and for repeatedly reading out the held signal portion therefrom at a reading rate synchronous with the nominal horizontal scanning frequency and the nominal vertical scanning frequency, thereby generating a first frame signal having the third carrier frequency;
    (g) second frequency conversion means for converting the third carrier frequency of the first frame signal into a fourth carrier frequency in response to the field signal having the second carrier frequency thereby generating a second frame signal having the fourth carrier frequency;
    (h) means for modifying the phase of the carrier of the second frame signal having the fourth carrier frequency to produce reference signals having a predetermined phase difference therebetween; and
    (i) means for detecting color component signals from the output video signal of the image pickup tube in response to the reference signals.

2. The color imaging apparatus of claim 1 further comprising:
    (a) means for comparing the phase of the output video signal form the image pickup tube and the second frame signal and generating a signal representing a phase difference therebetween;
    (b) means for deflecting an electron beam in the image pickup tube in response to an output signal of said phase comparing means.

3. The color imaging apparatus of claim 1 further comprising an optical shield extending between the color filter and the index signal generation pattern.

4. A color imaging apparatus comprising:
    (a) a color filter having a plurality of successively arranged recurrent groups of different color stripes;
    (b) an image pickup tube having a photoelectrical conversion target exposed to light passing through the color filter, the image pickup tube outputting a video signal including a plurality of periodic frames, each frame including a plurality of periodic frames, each frame including a plurality of scanning lines, the video signal containing a color signal component determined by a carrier modulated in phase in accordance with the individual color stripes of each said recurrent group of the color filter;
    (c) a first frequency converter for down-converting a frequency of the video signal outputted from the image pickup tube in accordance with a first conversion carrier and outputting a first frequency-converted signal,
    (d) a first memory for, before normal operation of the color imaging apparatus, storing a portion of the first frequency-converted signal occurring under conditions where the photoelectrical conversion target is exposed via the color filter to light having a color equal to the color of one of the stripes of the color filter, wherein the stored portion of the first frequency-converted signal corresponds to at least one frame interval of the video signal;
    (e) means for reading the stored signal from the first memory at reading rate synchronous with a nominal horizontal scanning frequency and a nominal vertical scanning frequency of the video signal, thereby generating a base signal;
    (f) a second frequency converter up-converting the frequency of the base signal in accordance with a second conversion carrier and outputting a second frequency-converted signal;
    (g) means for generating a reference signal in accordance with the second frequency-converted signal;
    (h) means for detecting a color signal from the video signal outputted from the image pickup tube in accordance with the reference signal;
    (i) an index signal generation pattern disposed in a light path to the photoelectrical conversion target and being operative to generate a first index signal in the video signal outputted from the image pickup tube, the first index signal occurring for at least one horizontal scanning interval of the video signal;

(j) a second memory storing a portion of the first index signal corresponding to at least one horizontal scanning line of the video signal and holding the stored portion of the first index signal during one vertical scanning interval of the video signal;

(k) means for reading the portion of the first index signal from the second memory at a reading rate synchronous with the nominal horizontal scanning frequency of the video signal, thereby generating a second index signal;

(1) means for updating the portion of the first index signal in the second memory at a period equal to a nominal vertical scanning period of the video signal; and (m) means for supplying the second index signal to the first and second frequency converters as the first and second conversion carriers.

5. The color imaging apparatus of claim 4 further comprising:
   (a) a deflection circuit deflecting an electron beam within the image pickup tube;
   (b) a phase comparator comparing the phases of the video signal outputted from the image pickup tube and the second frequency-converted signal outputted by the second frequency converter and outputting a signal representing a difference between the phases;
   (c) means for deriving ac components from the phase difference signal; and
   (d) means for controlling the deflection circuit in accordance with the ac components derived from the phase difference signal to perform raster centering control.

6. The color imaging apparatus of claim 4 further comprising an optical shield extending between the color filter and the index signal generation pattern.

* * * * *